(12) United States Patent
Hargreaves

(10) Patent No.: US 8,750,801 B2
(45) Date of Patent: Jun. 10, 2014

(54) SELECTIVE TRANSCODING OF ENCODED MEDIA FILES

(75) Inventor: David Richard Hargreaves, Cambridgeshire (GB)

(73) Assignee: Cambridge Silicon Radio Limited, Cambridge (GB)

( * ) Notice: Subject to any disclaimer, the term of this patent is extended or adjusted under 35 U.S.C. 154(b) by 607 days.

(21) Appl. No.: 12/563,684

(22) Filed: Sep. 21, 2009

(65) Prior Publication Data

US 2010/0075606 A1    Mar. 25, 2010

(30) Foreign Application Priority Data

Sep. 24, 2008   (GB) .................................. 0817488.0
Sep. 11, 2009   (GB) .................................. 0915961.7

(51) Int. Cl.
*H04B 7/00*   (2006.01)

(52) U.S. Cl.
USPC ........................................................ 455/41.3

(58) Field of Classification Search
USPC ................... 455/118, 574; 704/203, 500, 230
See application file for complete search history.

(56) References Cited

U.S. PATENT DOCUMENTS

| 7,912,728 B2* | 3/2011 | Kong et al. ................... 704/500 |
| 2008/0133227 A1* | 6/2008 | Kong et al. ................... 704/230 |
| 2008/0205664 A1* | 8/2008 | Kim et al. ....................... 381/77 |

* cited by examiner

*Primary Examiner* — Ankur Jain
(74) *Attorney, Agent, or Firm* — Fulbright & Jaworski LLP

(57) ABSTRACT

A method of mixing and transmitting encoded media data, wherein the data is decoded, mixed and recorded only when mixing with other data is required. When no mixing is required the encoded data is transmitted directly. In further methods, two sets of media data may be transmitted to an output device for mixing and outputting.

12 Claims, 4 Drawing Sheets

SELECTIVE TRANSCODING OF ENCODED MEDIA FILES

TECHNICAL FIELD

The present invention relates to the transcoding of encoded media files. It is particularly related to, but in no way limited to, decoding, mixing and recoding of encoded media files for transmission.

BACKGROUND

To provide efficient storage of media files the data is commonly compressed by encoding in a particular format. For example, audio files are commonly encoded in the MP3 format. Mobile devices may decode those files and transmit the data to an output device. Alternatively, the mobile device may transmit the encoded data to the output device for that device to perform the decoding and output. This may be attractive when the mobile device and output device are connected by a radio link as it reduces the data bandwidth required, and also reduces the processing capacity required by the mobile device as there is no requirement to decode the file prior to transmission. The output device may be provided with a dedicated decoding device, allowing the decoding to be performed efficiently.

A common example is the playing of encoded audio files. The encoded data is transmitted to a headset for output to a user. It may be required for the mobile device transmitting the encoded audio file to notify the user of an event by the output of a tone or other audio sign to the user. For example, the mobile device may be configured to audibly indicate to the user when its battery is running low, or if a message arrives. In order to reduce the impact on the user's experience, the tones should be mixed with the audio in a non-invasive manner.

Mixing cannot be performed directly into an audio file in its encoded form, and thus in order for a mobile device to mix tones with audio being sent to a listening device in an encoded format, the encoded file must be decoded, mixed and recoded before transmission. Decoding and encoding (transcoding) of audio files is a processor-intensive activity. For example, decoding and encoding an MP3 encoded file may require approximately 36 MIPS. In general, as the audio quality increases, as do the processing requirements. Transcoding before transmission to allow mixing therefore removes any processing capacity reduction achieved by transmitting encoded files. The processing capacity required for the transcoding also has a significant impact on power consumption, thereby decreasing battery life when playing back audio files.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

There is provided a method of mixing and transmitting encoded media data, comprising when no mixing is to be performed prior to transmission, performing the step of transmitting the encoded media data to an output device; and when it is required to mix the encoded media data with other media data prior to transmission, performing the steps of decoding the encoded media data, mixing the decoded media data with the other media data, coding the mixed media data, and transmitting the coded mixed media data to the output device.

There is also provided a mobile device for performing the methods described herein. The method may be performed by a mobile device.

The encoded media data may be an encoded audio file.
The other media data may represent audio information.
The mixed media data may be encoded into the same format as the encoded media data.
The mixed media data may be encoded into a different format than the encoded media data.
The mixed media data may be encoded at a different bit rate to encoded media data.
The step of decoding may comprise decoding the encoded media file to the frequency domain and converting the data to a time-domain representation of the media.
The step of mixing may be performed in the time domain.
The step of mixing may be performed in the frequency domain.
Switching between the transmission of encoded media data and encoded mixed media data may be performed with no interruption to the transmission of encoded data such that there is no effect on the decoding of the data at the output device.
The method may further comprise the step of transmitting a signal indicating that the format of the transmitted data will change prior to switching from transmitting encoded media data to transmitting encoded mixed media data.
The encoded media data may be a data file stored in a storage device of the device performing the method.
The encoded data may be transmitted via a wireless communications link.
The methods described herein may be performed by firmware or software in machine readable form on a storage medium. The software can be suitable for execution on a parallel processor or a serial processor such that the method steps may be carried out in any suitable order, or simultaneously.

This acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
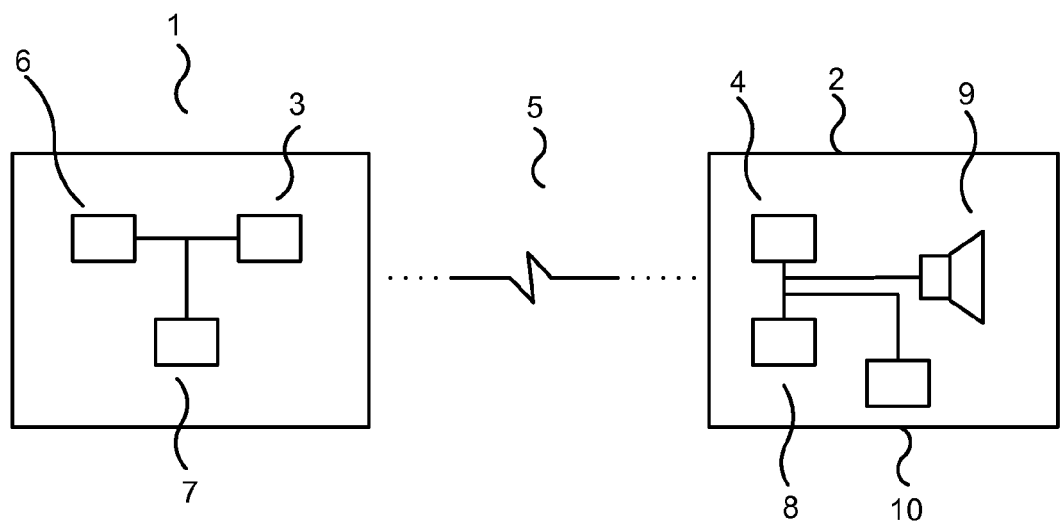
FIG. 1 is a schematic diagram of a mobile device and a headset, linked by a communications link.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

FIG. 1 shows an embodiment in which a mobile device 1 is configured to transmit an encoded audio file to a headset 2. A radio system 3 in the mobile device connects with a radio system 4 in the headset 2 to form a communications link 5 for the transmission of the encoded file. Mobile device 1 is also provided with a processor 6 and storage device 7. Processor 6 is connected to the storage device 7 and radio system 3, such that it can access files in storage device 7, and control the transmission of data via communications link 5. Headset 2 has a processor 8 for decoding received files and outputting the audio data to a speaker 9. Headset 2 may also be provided with a storage device 10.

Figure 2:
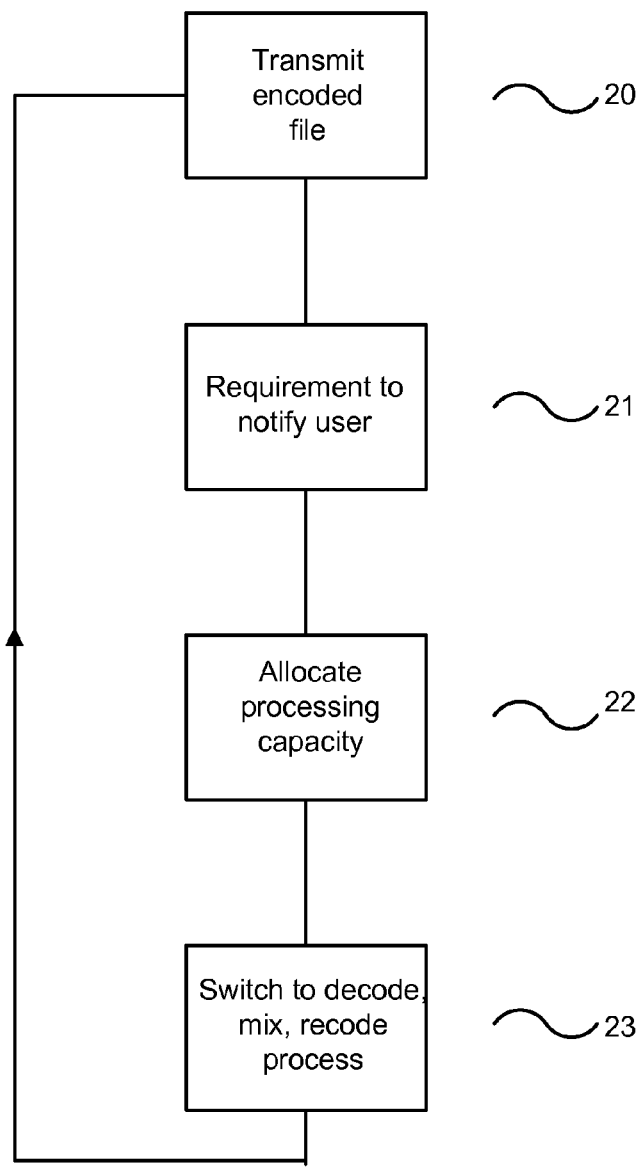
FIG. 2 is a flow diagram of a method for mixing and transmitting encoded media files.

FIG. 2 is a flow-chart of a method for providing efficient mixing during the transmission of encoded audio files.

At block 20 the mobile device begins transmission of an encoded file to the headset, as instructed by the user of the device. The processor 6 of the mobile device 1 controls the storage device 7 and the radio system 3 such that the correct encoded file is transmitted in the correct manner to the headset 2. Before transmission commences, the mobile device 1 and headset 2 will have agreed the transmission protocols and formats using established techniques. During the transmission of the audio file the mobile device's processor 6 oversees the transmission of the encoded file, but very little, or no, processing is performed by the processor in relation to the transmission. The processor can therefore be placed into a low-power consumption mode to reduce battery consumption.

At block 21 the processor becomes aware of a requirement to notify the user using an audio tone, and mixing must thus be performed. For example, a call may be received on the mobile device.

At block 22 the processor allocates sufficient processing capacity to perform the decoding, mixing and recording steps. At block 23 processor 6 switches to decoding, mixing and recoding the encoded file and outputs the recoded data. This switch is performed such that continuity in the data transmitted is maintained and accordingly there is no effect on the headset receiving the data.

Once the required indication has been completed, the processor 6 returns to block 20 and recommences transmitting the encoded file directly, without any decoding and recoding. When operating according to this method the mobile device only transcodes the encoded file when mixing is being performed. This is generally a very small proportion of the playback time, and accordingly the average processor utilization is reduced compared to existing systems in which transcoding is performed continuously, regardless of whether the facility to mix is actually being utilized. The average power consumption is thus also reduced. Since peak processing capacity is only required for limited periods during mixing, other uses of the processor can be scheduled to avoid periods when transcoding is performed, thus reducing the peak processing capacity requirements. Although the need for mixing can occur at any arbitrary time, a short delay before commencing that mixing to allow processor utilization to be reconfigured can be tolerated. This reduction in peak processing capacity may allow a reduction in the specification of the processor, and hence a reduction in the manufacturing cost and complexity of the mobile device.

The processing requirement to decode an encoded file is, for many common encoding formats, very significantly less than the requirement to encode that file. For example a typical requirement for decoding an MP3 file is 11 MIPS whereas the requirement to encode that file may be 25 MIPS. The peak processing requirement for transcoding an MP3 file may therefore be 36 MIPS, which may be significantly more than the requirement for performing other functions of the mobile device. The requirement to transcode a file, even for a short period, may therefore require the use of a more powerful processor than would otherwise be required.

Figure 3:
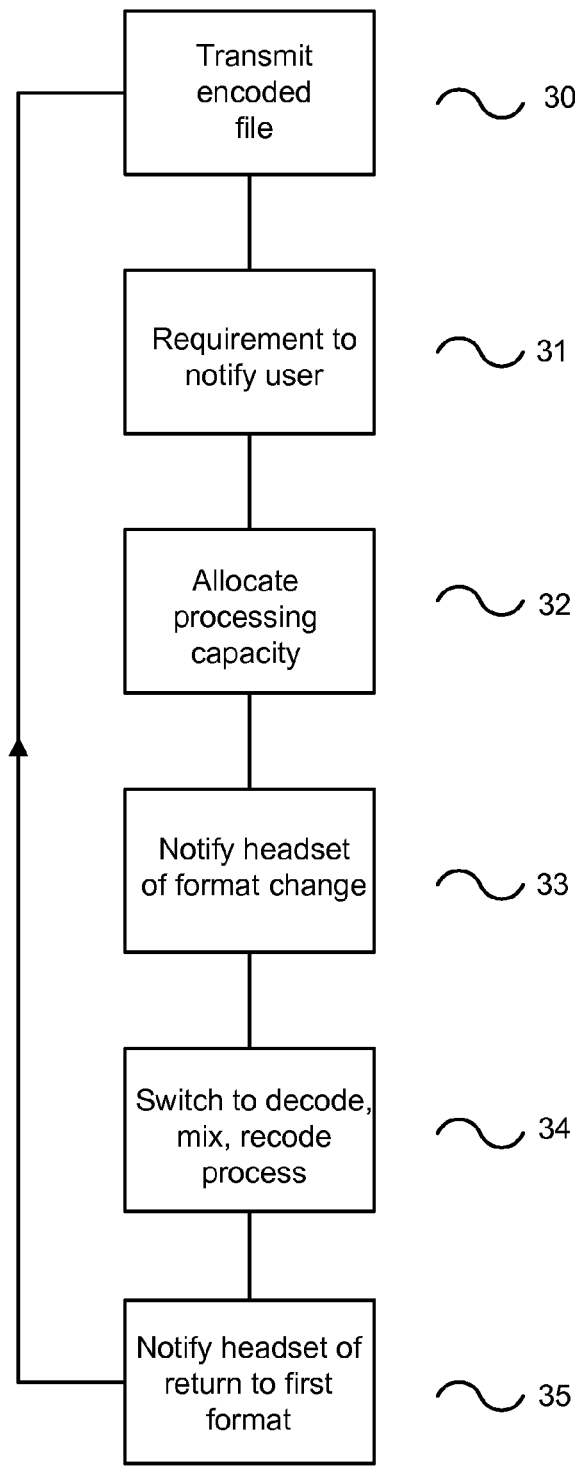
FIG. 3 is a flow diagram of a method for mixing and transmitting encoded media files utilizing a different encoding format.

As explained previously, transcoding is only performed when audio mixing is being performed. While mixing is being performed part of the user's attention is focused on the mixed tones, rather than the audio itself. It may therefore be possible to reduce the quality of the audio during mixing without noticeably degrading the user's experience. FIG. 3 shows a flow-chart of a method for reducing the processing requirement during transcoding.

At block 30 the mobile device is transmitting an encoded file and at block 31 there is a requirement to notify a user, as explained previously with reference to FIG. 2. At block 32 sufficient processing capacity is allocated for the transcoding and mixing, and at block 33 the mobile device notifies the headset that the format of the encoded file will be changing. At block 34 the processor begins decoding, mixing and recoding the encoded file. However, rather than recoding into the same format as the original file (for example MP3), the data is recoded into a format that has a lower processing requirement. For example, coding into SBC has a typical requirement of 7 MIPS, compared to 25 MIPS for MP3. The processing requirements for transcoding are therefore significantly reduced. The recoded file is transmitted to the headset, which decodes and outputs the audio. The headset is notified at block 33 that the encoding format is changing and therefore switches decoding processes at the correct time such that there is no break in decoding.

At block 35, once the mixing has been completed, the mobile device notifies the headset that it is returning to transmitting in the original format. Subsequently the process returns to block 30 where transmission of the encoded file is continued.

Such a system provides the reduction in average processing capacity described in relation to FIG. 2, but also provides a reduction in peak processing capacity. This reduction may allow the use of a less powerful processor and/or may allow the processor to continue performing other functions in addition to the transcoding function.

The steps (blocks 33 and 35) of notifying the headset that the format of encoding is going to change may be performed in a variety of manners. For example, the mobile device may transmit an indication that a new format will begin after a certain length of time, number of frames or at a certain point in the data. Alternatively, each frame, or group of frames, may be tagged with the encoding format used for that frame or group of frames. The headset may then check each tag and apply a suitable decoding process. Furthermore, the headset may be configured to automatically detect the format and thus the step of notifying the headset may be omitted. Similarly, depending on the processor architecture, there may be no requirement to allocate the processing capacity (blocks 22 and 32) before beginning transcoding. As will be appreciated by the skilled person, any suitable method may be utilized to change the coding format and to allow the processor to begin the task of transcoding.

It is not necessary, in either of the above-described methods to switch back to the original encoding format immediately upon completion of the mixing. The transcoding may continue for a period after the mixing is complete, or if switching between formats cannot be performed seamlessly, it may be preferable to await the end of the particular track or file before switching back to avoid further disruption to the user's experience.

Many encoding formats support a range of bit-rates for the encoded data. A lower bit-rate generally yields a lower quality encoding, but the processing requirements to perform the encoding are also reduced by reducing the bit-rate at which the data is recoded. The peak processing requirement during transcoding may therefore be reduced. If this technique is utilized, the headset is informed that the bit-rate is changing, rather than that the format is changing, as was done in the method of FIG. 3. The bit-rate used for the encoding could be defined on the basis of the processing capacity available at the time mixing is required such that the best quality encoding is utilized.

In a further alternative, mixing may be achieved by only performing a partial decoding. The may be decoded to only as far as the frequency domain samples and the mixing maybe performed in the frequency domain. Such mixing may yield a reduced quality audio signal, but the processing requirements are reduced since there is no need to transform into and out of the time domain.

Figure 4:
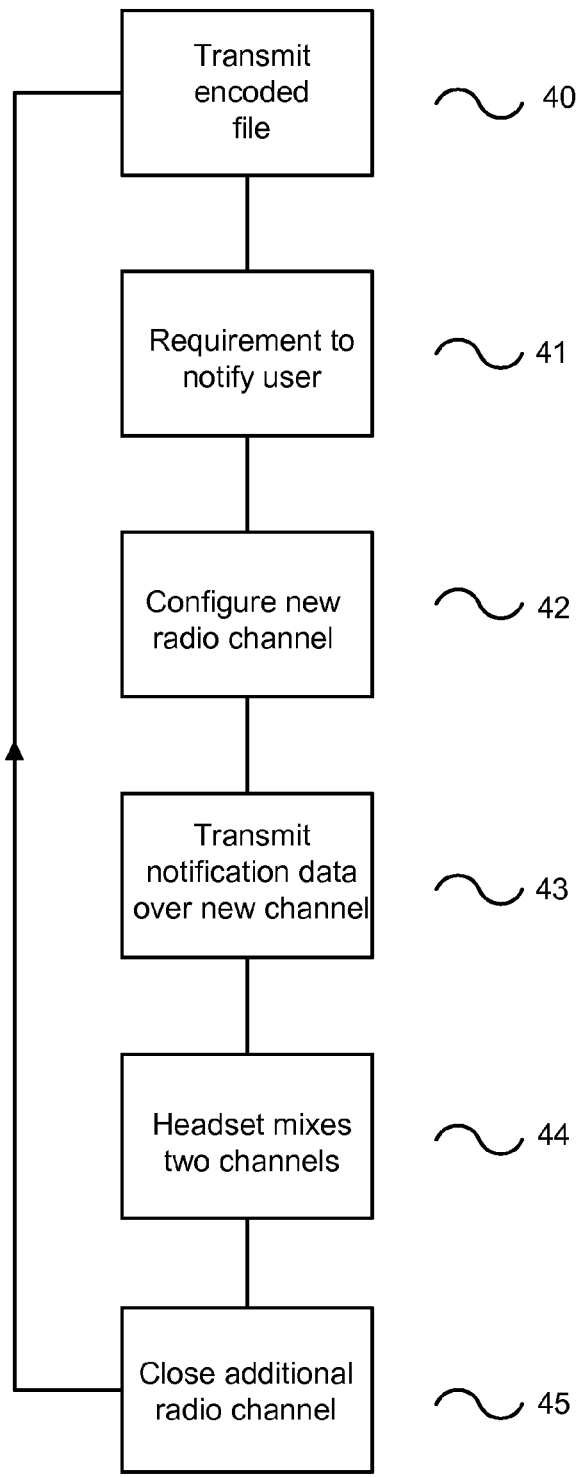
FIG. 4 is a flow diagram of a further method for transmitting and mixing encoded media files.

FIG. 4 shows a further technique in which mixing is performed by the headset rather than by the mobile device. Blocks 40 and 41 are equivalent to blocks 30 and 31, but at block 42 the mobile device configures a new radio channel between the mobile device and the headset for transmission of data representing the notification audio signal. The radio channel is configured according to standard practice for the particular radio protocol being utilized.

Once the radio channel is configured at block 43 the notification signal data is transmitted to the headset. Control information may be transmitted over the new radio channel, or may be sent over the existing radio channel prior to, during, or following configuration of the channel. The control information may indicate to the headset that it should expect audio data on the additional channel, the nature of that data and how that data should be treated.

The notification signal data may be sent in the same encoded format as the main data, or may be sent in any other convenient format that the headset can decode or interpret. The notification signal is likely to be a relatively simple sound not requiring high quality reproduction. An encoding format with a low data rate and/or sample rate may therefore be utilized to minimize the data rate required of the radio link, and also to minimize the processing required at the headset. Furthermore, the notification signal data may be sent in an unencoded format for direct output by the headset.

At block 44 the headset mixes the audio data from the main audio channel and the notification signal data for output to the user. If both signals are encoded, they are decoded as appropriate to the encoding format first and then mixed. If the notification signal is not encoded, then only the main audio data is decoded and then mixed with the uncoded notification signal. Once the notification signal has been transmitted to the headset the additional radio channel may be closed at block 45.

As will be appreciated by the skilled person many of the features described hereinbefore are also applicable to this aspect of the invention. For example, the various encoding and data handling options described may be equally applicable when the mixing is performed at the receiver, The foregoing description has described the current invention with reference to encoded audio files, but the invention is also applicable to other forms of encoded media file, for example encoded visual data. The principles, systems and methods described herein may therefore be applied to any form of media data encoded and played back in an analogous fashion to the audio data described herein.

The storage devices may take any form as appropriate for the particular mobile device or headset. For example, the storage device may be removable or fixed media. Also, encoded files may be received by the mobile device from a further communications link and either processed directly, or stored into the memory device and then processed.

The use of term 'headset' is not intended to be restrictive to any particular audio playback device, but the term is used for clarity and convenience. The headset may be any device capable of receiving a transmitted encoded file, decoding that file, and outputting the decoded audio. For example, a car stereo system could be provided for use in this method.

The mobile device may be any device capable of performing the functions described herein. For example, it may be a music player or a mobile telephone. Furthermore, the methods described herein are also applicable to non-mobile devices, and the invention is not restricted to implementation in only mobile devices.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise and exclusive list and a method or apparatus may contain additional blocks or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

What is claimed is:

1. A method of selectively mixing encoded media data with other media data and transmitting the selectively mixed encoded media data, comprising:

in response to a requirement to notify a user while transmitting the encoded media data to an output device, reconfiguring processor utilization, transmitting a signal indicating that a format of transmitted data will change, and switching to decoding, mixing, and receding the encoded media data, including mixing the encoded media data with the other media data to generate mixed media data, and encoding the mixed media data into a different format than the encoded media data, thereby providing an indication to the user, wherein the transmitting the signal occurs prior to switching from transmitting encoded media data to transmitting encoded mixed media data;

in response to completion of the indication, reconfiguring the processor utilization and recommencing transmitting the encoded media data the output device without decoding and recoding the encoded media data prior to transmission.

2. The method of mixing and transmitting encoded media data according to claim 1, wherein the method is performed by a mobile device.

3. The method of mixing and transmitting encoded media data according to claim 1, wherein the encoded media data is an encoded audio file.

4. The method of mixing and transmitting encoded media data according to claim 1, wherein other media data represents audio information.

5. The method of mixing and transmitting encoded media data according to claim 1, wherein the mixed media data is encoded at a different bit rate than the encoded media data.

6. The method of mixing and transmitting encoded media data according to claim 1, wherein the decoding comprises decoding an encoded media file to a frequency domain and conversion to a time-domain representation.

7. The method of mixing and transmitting encoded media data according to claim 6, wherein mixing is performed in a time domain.

8. The method of mixing and transmitting encoded media data according to claim 1, wherein the mixing is performed in a frequency domain.

9. The method of mixing and transmitting encoded media data according to claim 1, wherein switching between the transmission of encoded media data and encoded mixed media data is performed with no interruption to transmission of encoded data such that there is no effect on the decoding at the output device.

10. The method of mixing and transmitting encoded media data according to claim 1, wherein the encoded media data is a data file stored in a storage device of a device performing the method.

11. The method of mixing and transmitting encoded media data according to claim 1, wherein encoded data is transmitted via a wireless communications link.

12. A mobile device associated with an output device and having programming for mixing and transmitting encoded media data, the programming comprising:

in response to a requirement to notify a user while transmitting the encoded media data to an output device, reconfiguring processor utilization, transmitting a signal indicating that a format of transmitted data will change, and switching to decoding, mixing, and recoding the encoded media data, including mixing the encoded media data with other media data to generate mixed media data, and encoding the mixed media data into a different format than the encoded media data, thereby providing an indication to the user, wherein the transmitting the signal occurs prior to switching from transmitting encoded media data to transmitting encoded mixed media data;

in response to completion of the indication, reconfiguring the processor utilization and recommencing transmitting the encoded media data to the output device without decoding and recoding the encoded media data prior to transmission.

* * * * *

UNITED STATES PATENT AND TRADEMARK OFFICE
CERTIFICATE OF CORRECTION

PATENT NO. : 8,750,801 B2  
APPLICATION NO. : 12/563684  
DATED : June 10, 2014  
INVENTOR(S) : David Richard Hargreaves Page 1 of 1

It is certified that error appears in the above-identified patent and that said Letters Patent is hereby corrected as shown below:

In the Specification
    Column 5, line 27, delete "The may" and replace with --The file may--.
    Column 6, line 5, delete "receiver," and replace with --receiver.--.

In the Claims
    Column 7, claim 1, line 1, delete "receding" and replace with --recoding--.
    Column 7, claim 1, line 12, delete "data the" and replace with --data to the--.

Signed and Sealed this  
Eleventh Day of November, 2014

Michelle K. Lee  
*Deputy Director of the United States Patent and Trademark Office*